United States Patent

Trubey et al.

[11] Patent Number: 5,572,534
[45] Date of Patent: Nov. 5, 1996

[54] METHOD FOR MERGING WRAPPED MEDIA SEGMENTS ONTO A WORKING NETWORK

[75] Inventors: Bradley S. Trubey, Raleigh; Anthony D. Walker, Rougemont, both of N.C.

[73] Assignee: International Business Machines Corporation, Armonk, N.Y.

[21] Appl. No.: 449,866

[22] Filed: May 24, 1995

[51] Int. Cl.⁶ .................................................. G06F 11/00
[52] U.S. Cl. ...................... 371/20.6; 371/61; 395/185.08; 370/13
[58] Field of Search .................... 371/20.6, 11.2, 371/20.1, 20.5, 61, 62, 47.1, 42, 46; 370/13, 14, 16.1, 85.5, 85.12, 100.1; 395/550, 185.05; 375/368

[56] References Cited

U.S. PATENT DOCUMENTS

| | | | |
|---|---|---|---|
| 5,361,250 | 11/1994 | Nguyen et al. | 370/16.1 |
| 5,365,513 | 11/1994 | Copley et al. | 370/17 |
| 5,383,191 | 1/1995 | Hobgood et al. | 371/11.2 |
| 5,384,779 | 1/1995 | Patrick et al. | 370/85.12 |
| 5,463,634 | 10/1995 | Smith et al. | 371/20.6 |

*Primary Examiner*—Robert W. Beausoliel, Jr.
*Assistant Examiner*—Phung My Chung
*Attorney, Agent, or Firm*—Stephen T. Keohane; John B. Frisone

[57] ABSTRACT

A process for testing a wrapped segment of a dual token ring transmits idle signals on the segment and monitors the received signals. If either an Active Monitor, Standby Monitor or Beacon frame is received the process loops. If a Ring Purge frame is received the process exits successfully and the segment is unwrapped. If a timer expires prior to the above, transmission shifts to a Claim Token frame. The process loops if a Beacon frame is received or if one of two timers expires. The process exits and the segment is unwrapped if a Ring purge frame is received or if n Claim Token frames are received having the hub source address.

5 Claims, 4 Drawing Sheets

RESTORED RING

DEAD SEGMENT AFTER MERGE

LIVE SEGMENT BEFORE MERGE

RECOVERY ASIC    LIVE SEGMENT

METHOD FOR MERGING WRAPPED MEDIA SEGMENTS ONTO A WORKING NETWORK

This invention relates to dual ring token passing networks and more particularly to a method for monitoring wrapped segments interconnecting network hubs, detecting segment media continuity and unwrapping the previously wrapped segment to merge the segment onto the working network.

BACKGROUND OF THE INVENTION

Token ring networks can include as many as 250 end stations, typically connected together at one or more concentrators or hubs. In those instances where two or more hubs are used to provide enough ports to accommodate the end station the hubs are interconnected by wire or fiber segments or trunks designated "Ring In" and "Ring Out" on token ring networks.

During normal ring operation, these segments pass signals between the hubs they interconnect. In the event of a segment failure, it is critical that hardware or software at the hub detect the failure condition and wrap Ring In to Ring Out to bypass the failed segment. This converts the dual ring to a single working ring when a wrap occurs at both ends of the failed segment. The IEEE 802.5 token ring standard describes a method for accomplishing the needed wrap.

Wrapping a faulty segment is only half of the problem. Once the fault has been corrected the ring must be unwrapped if another fault occurs and needs to be bypassed. The IEEE 802.5. Token Ring Standard sets forth a procedures for unwrapping and merging a wrapped segment (or trunk) in a dual ring token passing network. However, the procedure requires at least the use of one full function media access control (MAC) device or adapter connected to the wrapped segment.

U.S. patent application Ser. No. 08/381,695, filed on Jan. 31, 1995 and assigned to the same assignee as this application discloses an application specific integrated circuit (ASIC) isolation and restoration device which is substantially lower in cost than a full IEEE 802.5 Token Ring MAC device. This device in combination with novel methods of operation is capable of achieving end results equal to or comparable to results achieved by use of a full MAC when operated as recommended in the IEEE 802.5 Standard.

The ASIC device while capable of accomplishing some of the end results achieved by a full MAC device is, however, not capable of engaging in token passing routines, a critical function performed by a full MAC device when implementing the recovery from a wrapped segment recommended in the IEEE 802.5 standard.

SUMMARY OF THE INVENTION

According to the invention an ASIC device connected to and under control of the hub processor is inserted into the wrapped segment. The input is isolated from the output. The hub processor loads predetermined MAC frames into the transmit buffer of the ASIC device and MAC frames received at the input buffer are detected by the ASIC device and the hub processor is interrupted. The hub processor reads the buffered received MAC frames and interprets them. Based on the interpretation, the hub processor takes a number of predetermined steps which include at least one of the steps set forth below. The processor can depending on the particular received MAC frame unwrap the segment and thereby connect it to the operating ring, go into repeat mode and monitor the input buffer until a number of predetermined MAC frames are received and then unwrap the segment or upon detecting failure restart the merger process.

DETAILED DESCRIPTION OF THE INVENTION

Figure 1:
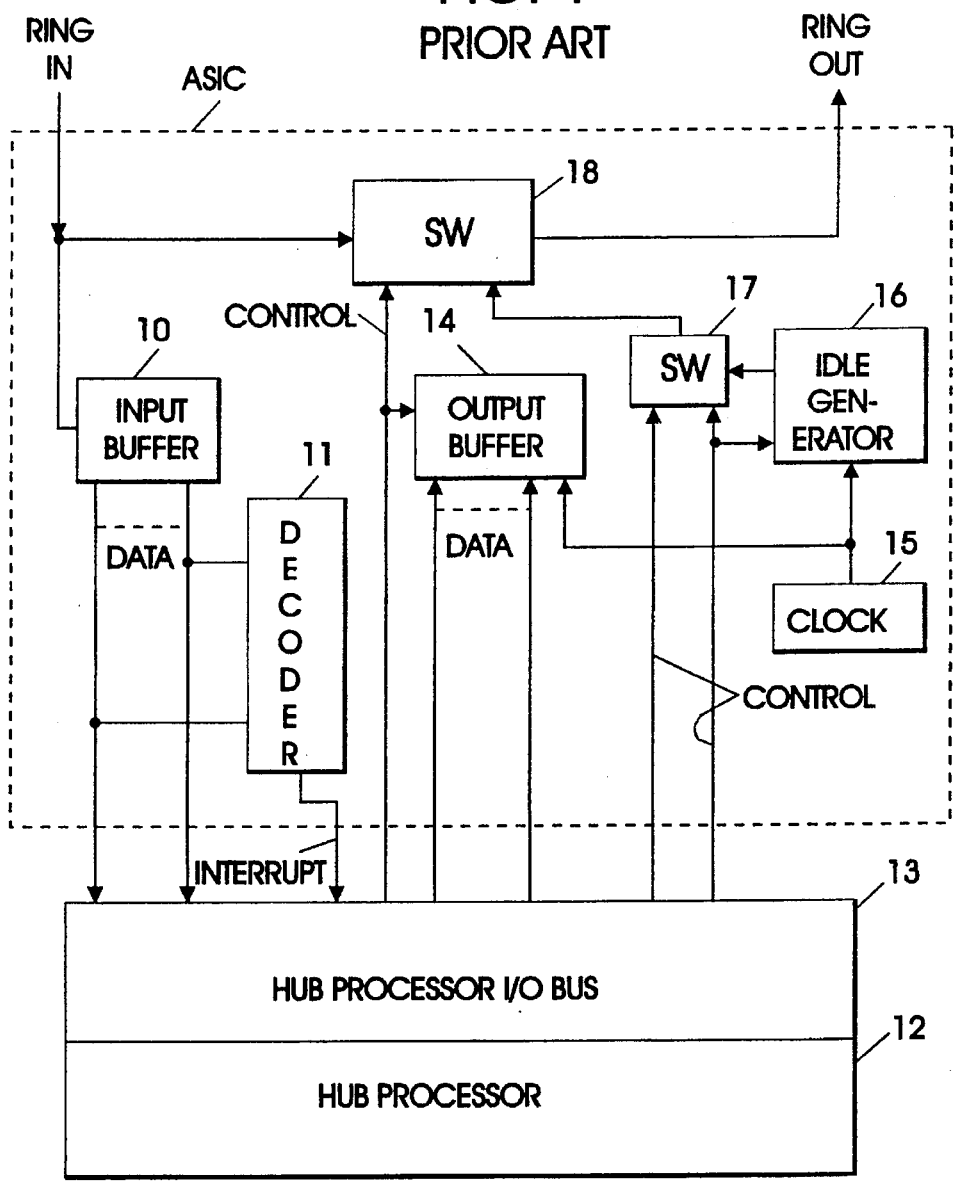
FIG. 1 is a block diagram of the prior art ASIC device and it's interconnection to a hub processor via a hub processor I/O bus.

A prior art ASIC device is illustrated in block form in FIG. 1. It includes an input buffer 10 connected to an input labeled "Ring In" for receiving the serial data signals from a ring or segment. Buffer 10 has a parallel data output connected to a decoder 11 which is designed to recognize a number of MAC frames. When decoder 11 recognizes one of the MAC frames it interrupts the hub processor 12 via the hub processor I/O bus 13. At this time the hub processor can read the contents of the input buffer 10 and depending on the state it is in take appropriate action.

The ASIC device is provided with an output buffer 14 which is connected to hub processor 12 by the I/O bus 13. The processor 12 can load predetermined frames into the output buffer 14 for transmission via switches 17 and 18 to an output "Ring Out" which can be connected to a ting or segment. A clock 15 drives the output buffer 14 and an idle generator 16 which along with the output buffer 14 are selectively connected to Ring Out via switches 17 and 18 which processor 12 controls.

The ASIC (hereafter referred to as the "Recovery ASIC") must be able to transmit various MAC signal frames onto the test segment and receive and recognize various MAC frames to determine when the segment is not faulty. The unwrapping process described below requires that the Recovery ASIC be able to transmit under control of the hub processor a stream of idles and a Claim Token MAC frame. It must be capable of recognizing Beacon frames, Claim Token frames, Ring Purge frames and Active Monitor Present and Standby Monitor Present frames.

After a failed segment has been wrapped it can be in only one of three states when the merge process resident in the hub processor and described below is activated. The segment might still be broken in which case any test by the merge process will fail and leave the segment wrapped. After appropriate time outs the process will repeat until the fault disappears. Both before and after the merge attempt the ring and the failed segment will look like the ring illustrated in FIG. 2A.

Figure 2G:
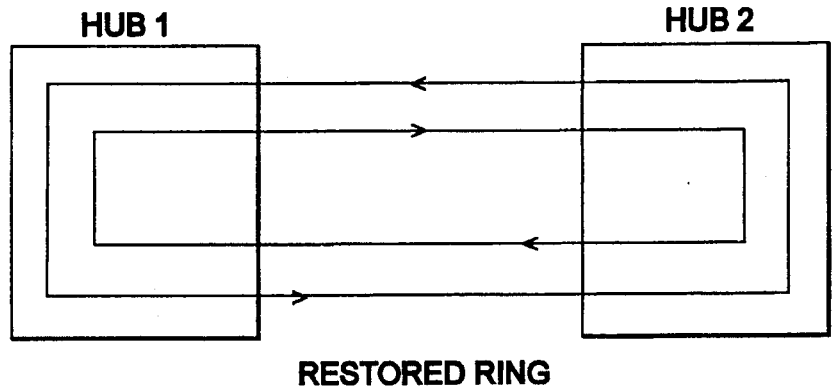
FIGS. 2A–2G illustrate various dual ring configurations starting with an isolated broken segment in FIG. 2A and progressing through various stages to a fully restored dual ring in FIG. 2G; and, FIG. 3 is a Merge Manager State Diagram illustrating the operation of the hub processor in response to MAC frames received from the ASIC devise connected to the wrapped segment.
Figure 2A:
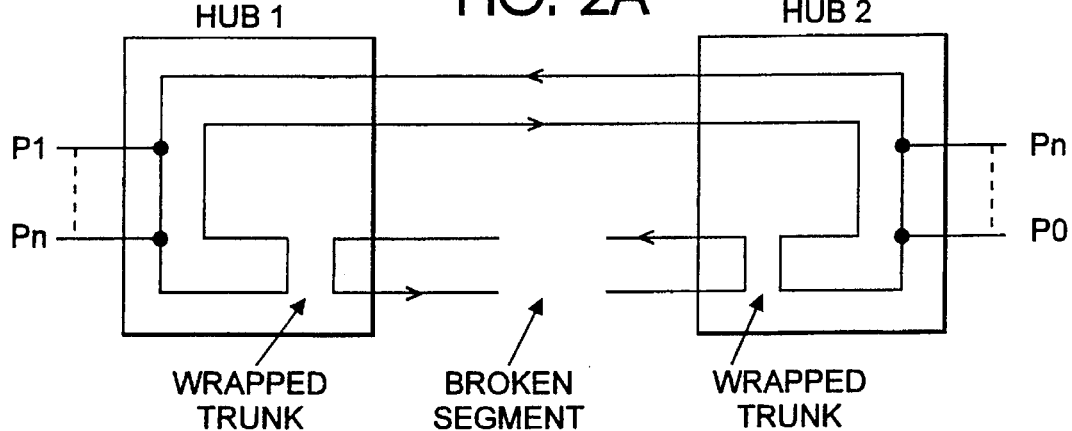
Figure 2B:
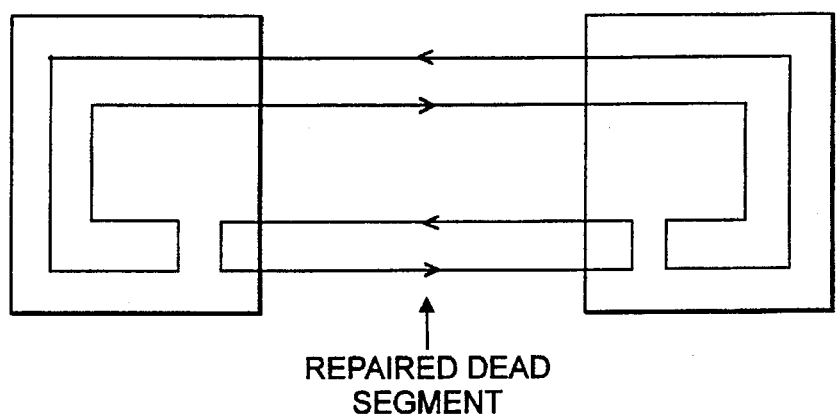
Figure 2C:
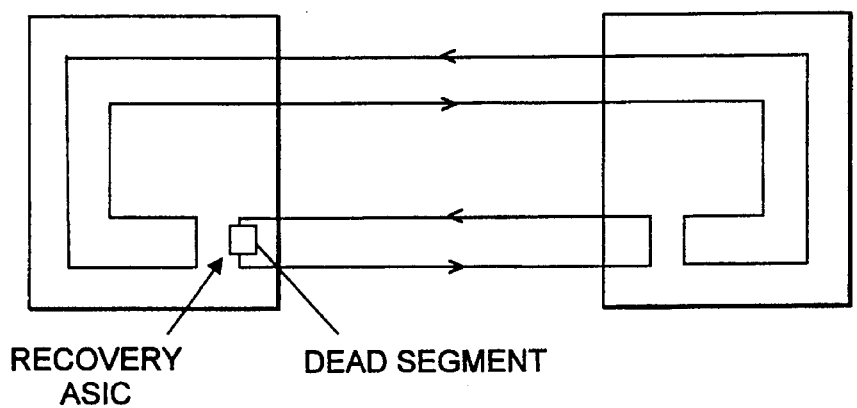
Figure 2D:
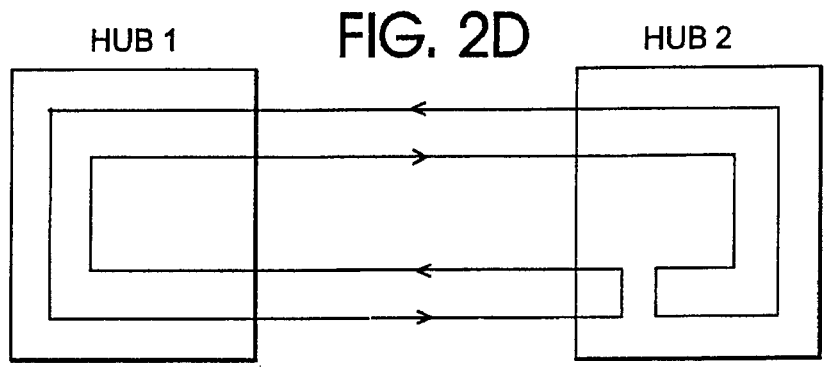

A second state is illustrated in FIG. 2B. Here the break has been repaired and the formerly broken segment is considered dead since it has no stations connected thereto. When a Recovery ASIC is inserted in the dead segment FIG. 2C and runs a successful test (described below) the segment merges at hub 1 FIG. 2D.

Figure 2E:
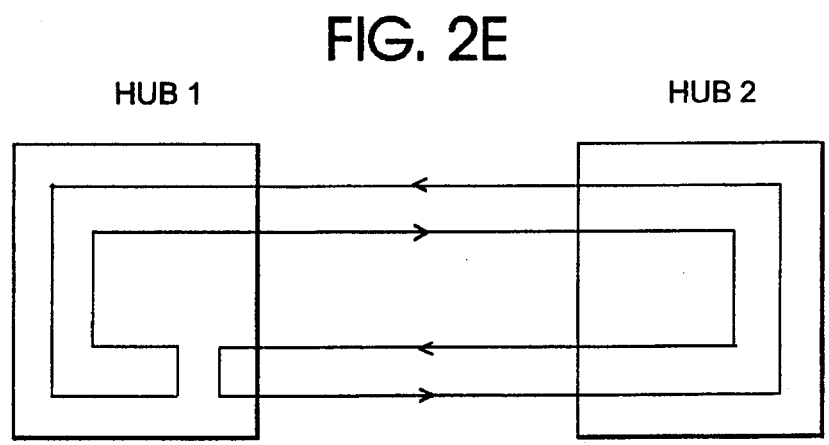
Figure 2F:
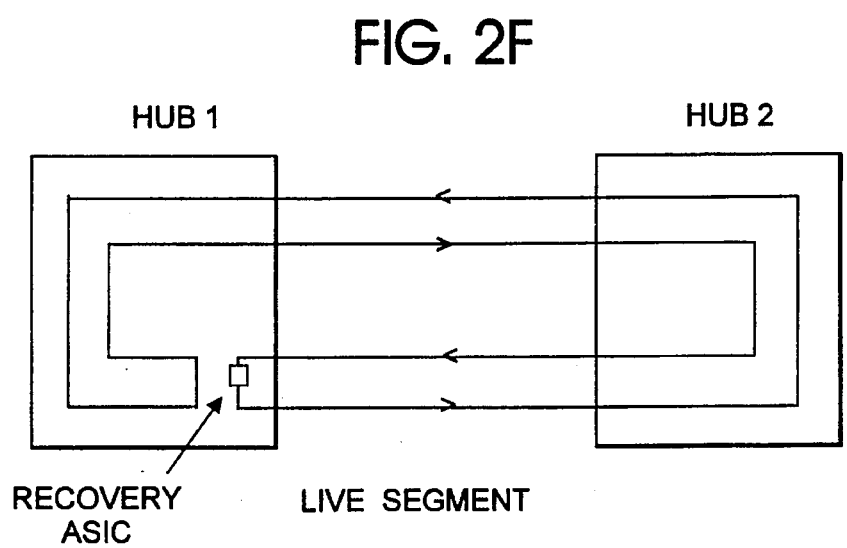

FIGS. 2E, 2F and 2G illustrate how a live segment merges into a fully restored dual ring network. Once the dual ring network is reestablished a subsequent segment failure can be handled in the same way. If dual ring operation is not restored it is possible, under certain circumstances, that a subsequent failure can result in multiple segregated operating rings in which stations on one ring can not communicate with stations on the other operating ring.

Figure 3:
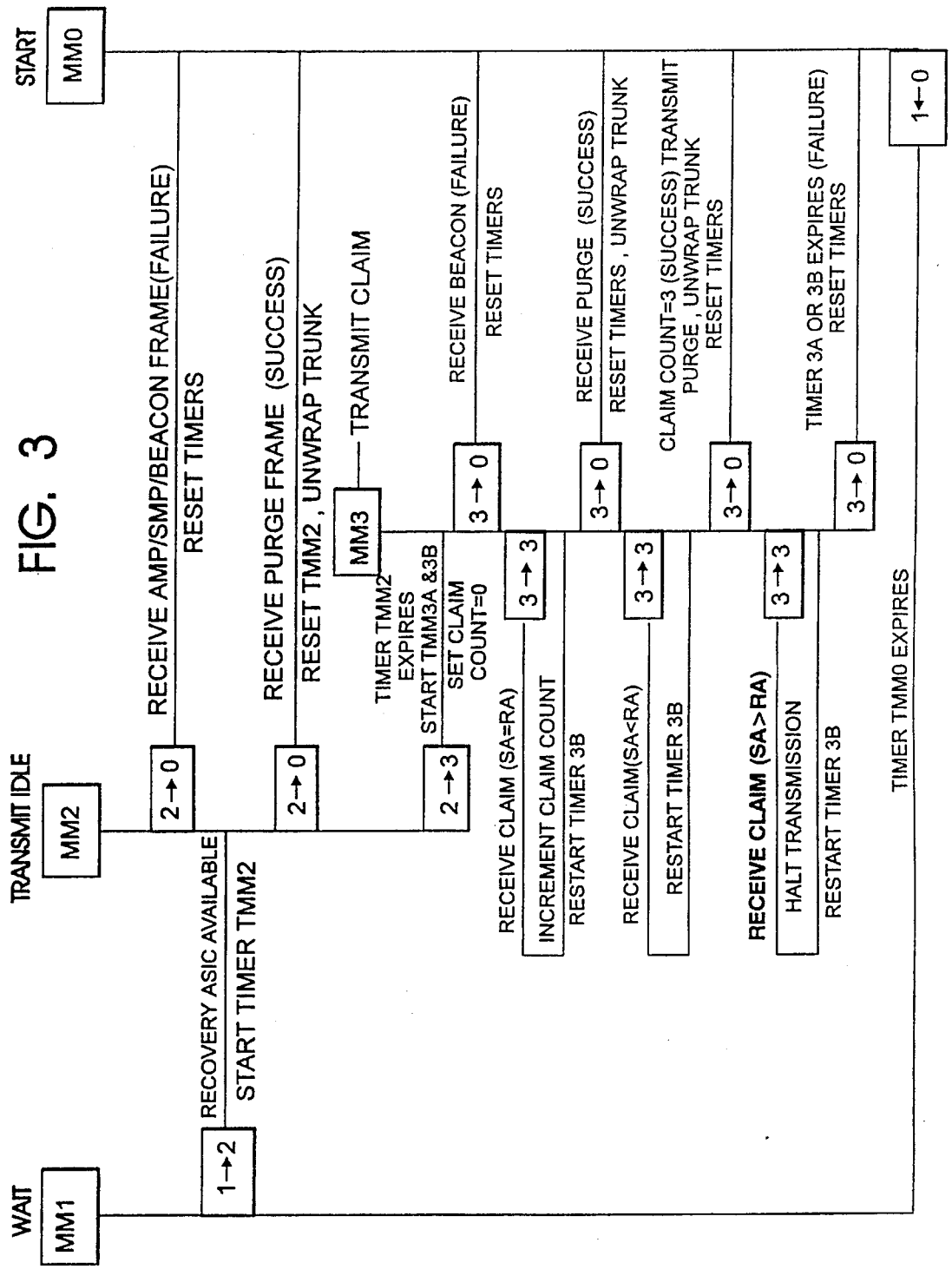

FIG. 3 is a state diagram of the Merge Manager Program (MMP) which runs in the hub processor when a failed segment or trunk has been wrapped in order to detect correction of the failure so that normal dual ring operation can be resumed. When the segment is wrapped the MMP is activated in state MM0, at which time a timer TMM0 is started. Timer TMM0 is started any time the MMP is in state MM0 and a segment is wrapped. If the MMP is in state MM0 and no segment is wrapped timer TMM0 is not started. When the timer TMM0 expires the MMP changes to state MM1 in which it waits until a Recovery ASIC is available and connected into the test segment at which point it starts timer TMM2 and goes to state MM2. If each segment is provided with a permanently connected Recovery ASIC only a single state would be required.

In state MM2 the hub processor control program causes the Recovery ASIC to transmit idle signals onto the segment under test. If during state MM2 the recovery ASIC receives an Active Monitor Present (AMP), a Standby Monitor Present (SMP) or a Beacon frame the MMP returns to state MM0 and resets all timers. Receipt of any of these frames indicates that the segment under test is still broken and failure of the test is indicated. After returning to state MM0 timer TMM0 is restarted, since the segment is still wrapped, and the process thus far described is repeated. If a Ring Purge frame is received before timer TMM2 expires the MMP resets timer TMM2, unwraps the segment and returns to state MM0 since receipt of the Ring Purge frame indicates that the break in the segment has been repaired.

If timer TMM2 expires before any of the above identified frames is received, the MMP goes to state MM3. In state MM3 it starts timers TMM3A and TMM3B and sets a Claim Token MAC frame counter equal to zero (Claim=0) and then causes the Recovery ASIC to start transmitting Claim Token MAC frames onto the wrapped segment. Receipt of a Beacon frame or the expiration of either counter 3A or 3B while in state MM3 causes the MMP to reset the timers and return to state MM0 with a failure indicated. The process described above is repeated once the MMP returns to state MM0.

Receipt of a Ring Purge MAC frame while in state MM3 indicates that the break in the segment has been healed and the MMP will reset the timers, unwrap the trunk and return to state MM0. Since the trunk or segment is now unwrapped no further action takes place at this time in state MM0 (timer TMM0 is not restarted). Receipt of a Claim Token MAC frame while in state MM3 requires a somewhat different handling. A wrapped segment may have remote ends in two different hubs which are simultaneously testing the wrapped segment. Therefore, it is necessary to examine the source address (SA) included in a received Claim Token MAC frame. If the source address SA is the same as the Recovery ASIC address RA (SA=RA) then the receiving Recovery ASIC was the source of the received frame and the frame has completed a round trip indicating that the segment is repaired. However, making this decision on the receipt of only a single Claim Token frame could pose problems. Each time a frame with SA=SR is received the Claim counter described above is incremented and the MMP will exit state MM3 to state MM0 successfully only when the claim count equals 3. When this occurs the hub control program causes the Recovery ASIC to transmit a single Ring Purge MAC frame after the segment is unwrapped and the timers have been reset. Timer TMM3A is provided with a longer time period than timer TMM3B. Thus, failure occurs if timer TMM3B expires before the next Claim Token MAC frame with SA=RA is received to restart timer TMM3B or if three Claim Token MAC frames with SA=SR are not received before timer TMM3A expires.

If the source address SA is greater than the receiving Recovery ASIC address RA (SA>RA) then transmission is halted, Ring In is connected to Ring Out and timer TMM3B restarted. This occurs when another Recovery ASIC at a remote end with a higher address is testing the segment. If that test concludes successfully the remote Recovery ASIC will transmit additional Claim Token frames which will keep restarting timer TMM3B which will hold the MMP in state MM3. Eventually (after transmitting and receiving 3 Claim Token frames) the remote Recovery ASIC will transmit a Ring Purge frame which will cause the MMP exit the test as described above in connection with the description of the receipt of the Ring Purge MAC frame.

If the source address SA is less than the receiver address RA (SA<RA) timer TMM3B is restarted. Eventually the remote Recovery ASIC will discontinue transmitting Claim Token MAC frames when it discovers that a Recovery ASIC with a higher address is also testing the segment. In time the Recovery ASIC with the higher address will receive three Claim Token frames and exit as described above.

While only a single embodiment of the invention has been shown and described in detail it will be apparent to those skilled in this art that changes may be made in the invention without departing from the spirit and scope of the invention.

We claim:

1. In a dual token ring network which includes a plurality of station attachment hubs interconnected by ring segments to form the dual ring and each of said hubs includes means for wrapping a broken or failed segment to form a single operating ring thereby bypassing a broken or failed segment and means for transmitting predetermined media access control (MAC) signals onto said segment, a method for testing a wrapped segment to determine if the break has been healed and the segment can be merged onto the operating ring comprising the following steps:

starting a first timer and transmitting a plurality of idle signals onto the wrapped segment;

receiving signals on the wrapped segment;

repeating the above process steps upon receipt of an Active Monitor, Standby Monitor or Beacon frame during the pendency of the first timer;

unwrapping the segment upon receipt of a ring purge frame during the pendency of the first timer and exit the process;

upon the expiration of the first timer, discontinue transmitting the idle signals, transmit Claim Token flames on the segment and start a second timer;

repeating all of the above process steps if during the pendency of the second timer a Beacon frame is received or the second timer expires; and, unwrapping the segment and exiting the process if during the pendency of the second timer a Ring Purge frame is received or when n Claim Token frames all having a predetermined source address are received.

2. The method set forth in claim 1 in which the second timer is provided with two periods, a first short period for accumulating the count of each of the n Claim Token frames to assure that the frequency of receipt meets certain criteria and a second longer period within which the process is completed.

3. The method set forth in claims 1 or 2 in which the number n of Claim Token frames received before the segment is unwrapped and the process exits is set to 3.

4. The method set forth in claims 1 or 2 in which a third timer is set and must expire before the process set forth starts.

5. The method set forth in claim 4 in which the predetermined source address in the Claim Token frame is the address of the hub receiving the Claim Token frame.

* * * * *